No. 877,660.
PATENTED JAN. 28, 1908.
J. MEIKLE.
PROCESS OF MAKING VEGETABLE EXTRACTS.
APPLICATION FILED DEC. 11, 1906.
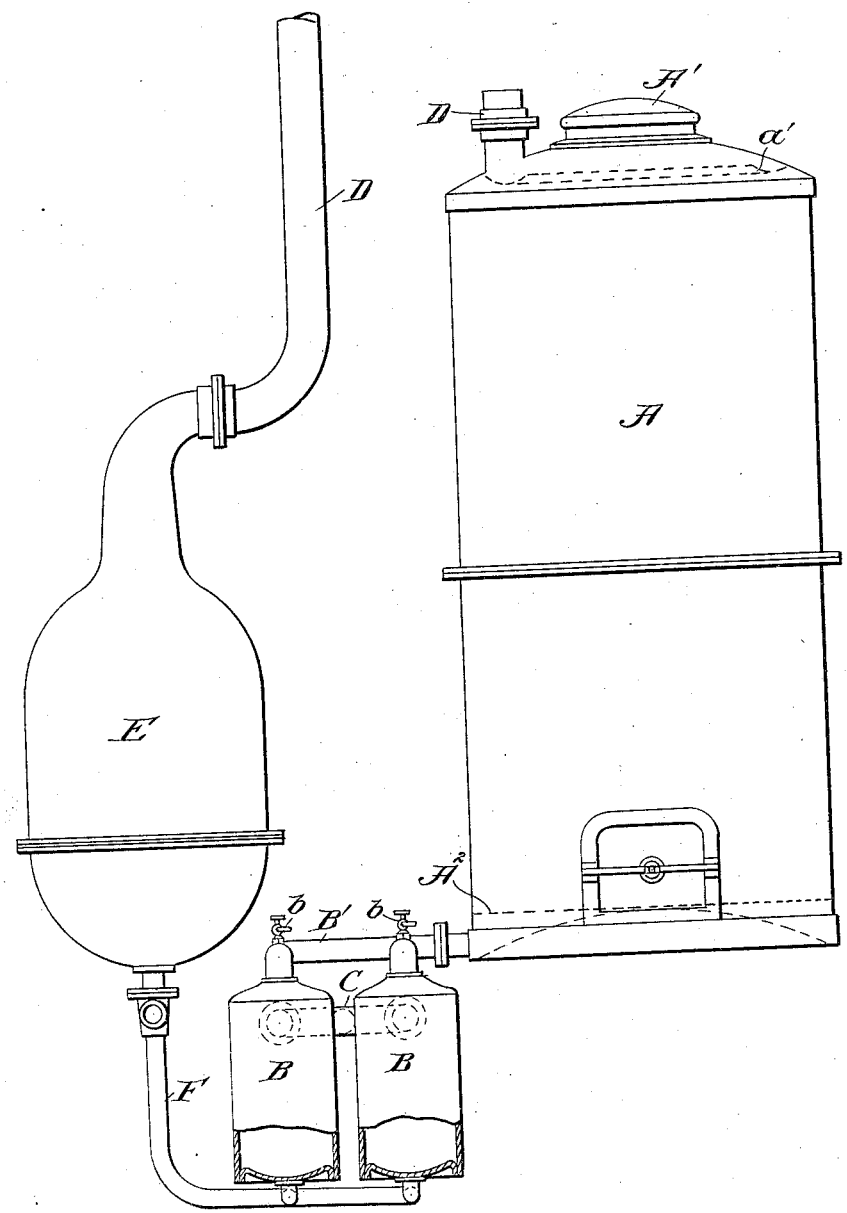
Witnesses:
Inventor:
JAMES MEIKLE,
BY van Oldenneel & Schoenlank
Att'ys.

UNITED STATES PATENT OFFICE.

JAMES MEIKLE, OF GLASGOW, SCOTLAND.

PROCESS OF MAKING VEGETABLE EXTRACTS.

No. 877,660. Specification of Letters Patent. Patented Jan. 28, 1908.

Application filed December 11, 1906. Serial No. 347,311.

*To all whom it may concern:*

Be it known that I, JAMES MEIKLE, a subject of the King of the United Kingdom of Great Britain and Ireland, and residing at Maryhill, Glasgow, Scotland, have invented a certain new and useful Improvement in Processes of Making Vegetable Extracts, of which the following is a specification.

This invention has for its object to lessen the cost of production of tannin and other soluble matters obtained from bark, wood and like vegetable substances, and it consists of a continuous process of extracting such matters from the bark or like material by drawing through it under the influence of a vacuum the exhaust steam or vapor arising from evaporators in which the extracted liquor is concentrated, whereby fuel is economized and the extraction is more rapidly effected.

The apparatus employed comprises a series of extractors each of which is preferably made in the form of a large cylindrical closed vessel having a perforated division plate on which the bark or like material is placed in the upper compartment while the lower compartment serves as a receptacle for the liquid extract.

The upper compartment is connected to an evaporator or series of evaporators arranged as a multiple-effect, and the lower compartment is connected to a number of receivers which are in turn connected to the evaporator, an air pump being interposed to produce the required vacuum. The process of extraction is applicable to the treatment of other vegetable matters such as sugar cane, beet and the like.

The accompanying drawing illustrates diagrammatically an arrangement of the apparatus employed in carrying out the invention.

In the drawing A is the extractor which is of cylindrical formation and is fitted with a removable air tight cover $A^1$ through which the charge of bark or other vegetable matter is admitted; a perforated screen $a^1$ being also provided to distribute the vapor which is drawn through the extractor. Near the lower end is a perforated division plate $A^2$ on which the material rests, the space or compartment below receiving the liquid extract. From this compartment the liquid flows into one or more of a number of receivers B through piping $B^1$ while an air pump not shown is connected to these vessels B through piping C. The upper compartment of the extractor A is connected by piping D to an evaporator E which in turn is connected by piping F to the receivers B.

In the operation of the apparatus the extractor having been charged and closed, the air pump is put into operation to create the requisite vacuum and draw the vapor from the evaporator or evaporators through the material within the extractor. The liquid collecting under the perforated plate $A^2$ flows into the receivers B and when one or more are filled to the desired extent it or they are disconnected from the air pump and an air tap $b$ on the top is opened to admit atmospheric air whereupon the liquid contained in the receiver is drawn by the vacuum into the evaporator E, the vapor generated passing off through the piping D and condensing on the surface of the materials in the extractor A whereby it absorbs the soluble matter contained in the bark or other material.

Having now described my invention, what I claim and desire to secure by Letters Patent of the United States is:—

The herein-described continuous process of obtaining soluble extracts from vegetable matters, consisting in evaporating a solution of extract in a vacuum, drawing under a vacuum the vapors from the solution through said matters so as to cause the vapors to condense thereon, drawing off by suction a fraction of the condensed vapors containing fresh extract in solution, and forcing the condensate to flow under the action of air pressure to rejoin the first-mentioned solution.

In testimony whereof I have signed my name to this specification in the presence of two subscribing witnesses.

JAMES MEIKLE.

Witnesses:
WALLACE FAIRWEATHER,
JNO. ARMSTRONG, Junr.